(12) United States Patent
DeLuca et al.

(10) Patent No.: US 10,841,263 B2
(45) Date of Patent: Nov. 17, 2020

(54) SYSTEM AND METHOD FOR MESSAGE COMPOSITION BUFFERS

(71) Applicant: International Business Machines Corporation, Armonk, NY (US)

(72) Inventors: Lisa Seacat DeLuca, Baltimore, MD (US); Clifford A. Pickover, Yorktown Heights, NY (US); Dana L. Price, Surf City, NC (US); Aaron J. Quirk, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 81 days.

(21) Appl. No.: 15/014,700

(22) Filed: Feb. 3, 2016

(65) Prior Publication Data

US 2017/0220527 A1    Aug. 3, 2017

(51) Int. Cl.
| | |
|---|---|
| *G06F 17/21* | (2006.01) |
| *G06F 17/27* | (2006.01) |
| *G06F 17/28* | (2006.01) |
| *H04L 12/58* | (2006.01) |

(52) U.S. Cl.
CPC .............. *H04L 51/16* (2013.01); *H04L 51/04* (2013.01)

(58) Field of Classification Search
CPC ....... G06Q 10/107; H04L 12/58; H04L 17/21; H04L 51/27; H04L 51/28; H04L 51/16; H04L 51/12; H04L 51/04; G06F 17/21; G06F 17/27; G06F 17/28; H04M 1/72552; H04W 4/12; H04W 4/16

USPC ......................................................... 715/752
See application file for complete search history.

(56) References Cited

U.S. PATENT DOCUMENTS

| | | | |
|---|---|---|---|
| 7,568,007 B2 | 7/2009 | Narayanaswami et al. | |
| 7,725,538 B2 | 5/2010 | Kirkland et al. | |
| 8,290,476 B2 | 10/2012 | Jagetiya | |
| 8,782,133 B2 * | 7/2014 | Coutts | G06Q 10/107 |
| | | | 709/204 |
| 9,148,397 B2 * | 9/2015 | Talwar | H04L 51/38 |
| 9,665,850 B2 * | 5/2017 | McCann | G06Q 10/107 |

(Continued)

OTHER PUBLICATIONS

Jennifer F. Karen F., Outlook 2010 All-In-One for Dummies, Wiley Publishing, Inc. 2010.*

(Continued)

*Primary Examiner* — Mohammed H Zuberi
*Assistant Examiner* — Carl E Barnes, Jr.
(74) *Attorney, Agent, or Firm* — Cantor Colburn LLP; Michael O'Keefe

(57) ABSTRACT

Aspects include a method, system, and computer program product for providing a communication from a first communication device. The composition of a first message by a user in a first composition area of the first communication device is detected. The first message may be part of a first conversation stream between the user and a party on a second communication device. A triggering signal received at the first communication device allows the user to prepare a second message as part of a second conversation stream. In response to the triggering signal: a second composition area is opened at the first communication device for preparing the second message. The second message is transmitted in response to receiving a signal to send the second message.

20 Claims, 8 Drawing Sheets

(56) References Cited

U.S. PATENT DOCUMENTS

| | | | | |
|---|---|---|---|---|
| 2003/0120720 | A1* | 6/2003 | Montero | H04L 29/06 709/203 |
| 2004/0154022 | A1 | 8/2004 | Boss et al. | |
| 2005/0132298 | A1 | 6/2005 | Lueckhoff et al. | |
| 2007/0198646 | A1 | 8/2007 | Chen et al. | |
| 2007/0260975 | A1* | 11/2007 | Nordenhake | H04M 1/72552 715/246 |
| 2008/0046532 | A1 | 2/2008 | Caspi et al. | |
| 2008/0183832 | A1* | 7/2008 | Kirkland | G06Q 10/10 709/206 |
| 2009/0106686 | A1* | 4/2009 | Shin | H04L 51/04 715/781 |
| 2009/0177617 | A1* | 7/2009 | Lee | H04L 12/58 |
| 2009/0177750 | A1* | 7/2009 | Lee | G06Q 10/107 709/206 |
| 2009/0222523 | A1* | 9/2009 | Williams | H04L 51/04 709/206 |
| 2011/0219088 | A1* | 9/2011 | Klassen | G06F 15/02 709/206 |
| 2012/0124147 | A1* | 5/2012 | Hamlin | H04L 51/36 709/206 |
| 2013/0007137 | A1* | 1/2013 | Azzam | H04L 51/16 709/206 |
| 2013/0139107 | A1* | 5/2013 | Jung | G06F 3/017 715/810 |
| 2013/0218885 | A1* | 8/2013 | Satyanarayanan | G06Q 30/016 707/728 |
| 2013/0268260 | A1* | 10/2013 | Lundberg | G06F 17/28 704/8 |
| 2013/0275899 | A1* | 10/2013 | Schubert | G06F 3/0481 715/765 |
| 2014/0122626 | A1* | 5/2014 | Alam | H04L 51/16 709/206 |
| 2014/0143684 | A1* | 5/2014 | Oh | H04L 51/04 715/752 |
| 2014/0173460 | A1* | 6/2014 | Kim | H04L 51/18 715/753 |
| 2014/0245178 | A1* | 8/2014 | Smith | H04L 51/16 715/753 |
| 2014/0379818 | A1* | 12/2014 | Cudak | H04L 51/16 709/206 |
| 2015/0263997 | A1* | 9/2015 | Abate | H04L 51/046 715/753 |
| 2015/0334069 | A1* | 11/2015 | Winston | H04L 51/04 709/206 |
| 2016/0065519 | A1* | 3/2016 | Waltermann | H04L 51/16 709/206 |
| 2016/0164815 | A1* | 6/2016 | Cho | G06F 3/04842 709/206 |
| 2016/0179773 | A1* | 6/2016 | Shen | G06F 3/0488 715/753 |
| 2016/0378271 | A1* | 12/2016 | Toutain | H04L 51/34 715/752 |
| 2019/0095050 | A1* | 3/2019 | Gruber | G06F 3/0481 |

OTHER PUBLICATIONS

Puzzel-Dialogs-Getting-Started https://help.puzzel.com/hc/en-us/articles/206527229-Dialogs-e-mail-chat-social-media-.*

Internet Article; "How to Quick Reply & Compose Text Messages Without Leaving the Current App on Your iPhone," http://ios.wonderhowto.com/how-to/quick-reply-compose-text-messages-without-leaving-current-app-your-phone-0150820/; Dec. 16, 2003; pp. 1-6.

\* cited by examiner

SYSTEM AND METHOD FOR MESSAGE COMPOSITION BUFFERS

BACKGROUND

The present invention relates generally to electronic communications and, more specifically, to providing multiple composition buffers for electronic communication between two parties over electronic communication devices.

Various communication devices allow users to carry on a conversation using various electronic communication protocols. However, non-sequential conversation topics that may be handled with ease when people are communicating person-to-person generally are difficult to maneuver using electronic communication devices. For example, during a conversation over electronic communication devices, while a user is in the process of composing a message to another participant in the conversation, an incoming message can be received from the other participant that warrants a quick response. Current solutions for responding to the incoming message require a series of cumbersome instructions being entered into the communication device by the user. This problem is exaggerated on mobile platforms such as cellular smartphones and tablets, where support for multiple open windows or separate instances of the same application is limited by screen size.

SUMMARY

Embodiments include a method, system, and computer program product for providing a communication from a first communication device. A method includes detecting composition of a first message by a user in a first composition area of the first communication device, wherein the first message is part of a first conversation stream between the user and a party on a second communication device; and in response to a triggering signal to prepare a second message as part of a second conversation stream: opening a second composition area at the first communication device for preparing a second message corresponding to a second conversation stream, and transmitting the second message in response to receiving a signal to send the second message.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments of the present invention provide a method, system and computer product for providing communication between a first communication device and a second communication device using various communication protocols such as texting, instant messaging, Internet forums, chat rooms, etc. In one embodiment, a user (also referred to herein as "User A") is composing a first message on the first communication device to a person or group of people (also referred to herein as "other party" or "User B") as part of a first conversation stream or conversation topic between the user and the other party. While composing the first message, the user can receive a message from the other party which requires a response on a more urgent basis. The other party's message may or may not be related to the first topic of conversation. The user can pause composition of the first message and respond to the message received from the other party with a second message. After sending the second message, the user can then return to composing the first message. Alternatively, the user can pause composition of the first message to start a second (generally shorter) conversation topic with the other party on the user's own initiative.

Figure 1:
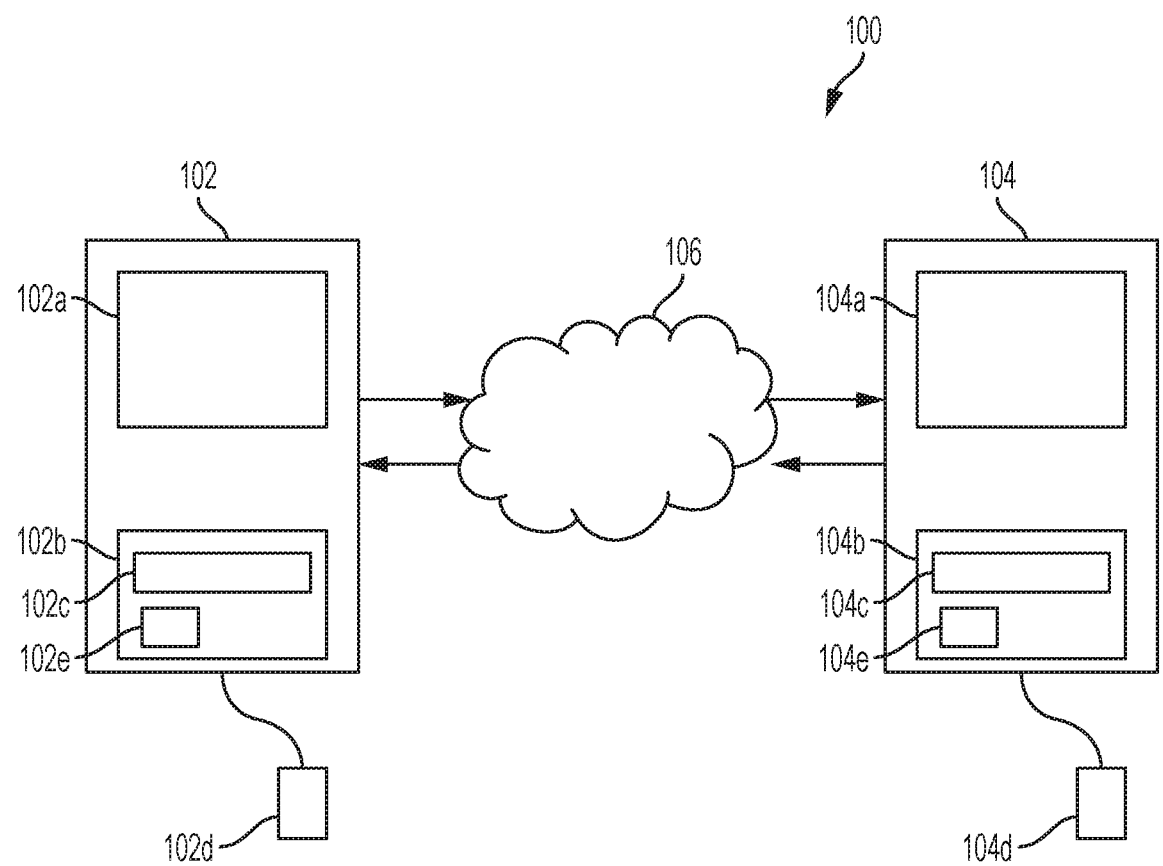
FIG. 1 shows a communication system in accordance with an embodiment of the present invention.

Turning now to FIG. 1, a communication system 100 is generally shown in accordance with an embodiment of the present invention. The communication system 100 includes a first communication device 102 and a second communication device 104 in communication with each other over a communication network 106 such as the Internet, cellar phone network, etc. The first communication device 102 and second communication device 104 can communicate using one or more communication protocols, such as texting (e.g., SMS, MMS, etc.), instant messaging (either one-on-one or one with a group), Internet forums, chat rooms (e.g., Slack, IRC), among others. The communication devices 102, 104 can be mobile devices, such as a cellular device, smartphone, tablet, etc. or a stationary device such as a desktop computer. The first communication device 102 need not be the same type of device as the second communication device 104.

The first communication device 102 allows User A to compose messages and send and receive messages as part of a conversation with User B. The first communication device 102 includes a display panel 102a that displays at least part of the conversation between the User A and User B. The first communication device 102 further includes a user interface 102b that allows User A to enter commands and/or signals into the communication device. In one embodiment, the user interface 102b can include a keyboard 102c and/or a mouse 102d. Additionally, the user interface 102b can include a microphone 102e allowing User A to speak a vocal command into the first communication device 102. In other embodiments, the user interface 102b can provide a touch screen that displays interactive user interface buttons that allow User A to enter signals or commands by touching the user interface at a location of the user interface buttons or by performing a gesture at the user interface 102b, generally but not necessarily with the user's fingers. In these embodiments, the display panel 102a can be integrated into the user interface 102b, so that the conversation and the input by User A are both displayed at the user interface 102b. The second communication device 104 can also include a display panel 104a and a user interface 104b including one or more of keyboard 104c, mouse 104d and microphone 104e.

The first communication device 102 and the second communication device 104 facilitate communication between User A and User B. In various embodiments, the first communication device 102 establishes a buffer for receiving messages at the first communication device 102 ("receiver buffer") from User B and an input buffer ("first input buffer") through which User A inputs messages into the first communication device 102. In an embodiment of the present invention, the first communication device 102 can establish a second input buffer for allowing User A to input a second message with regard to a second conversation topic between User A and the User B, as discussed below with respect to FIGS. 2-6.

Figure 2:
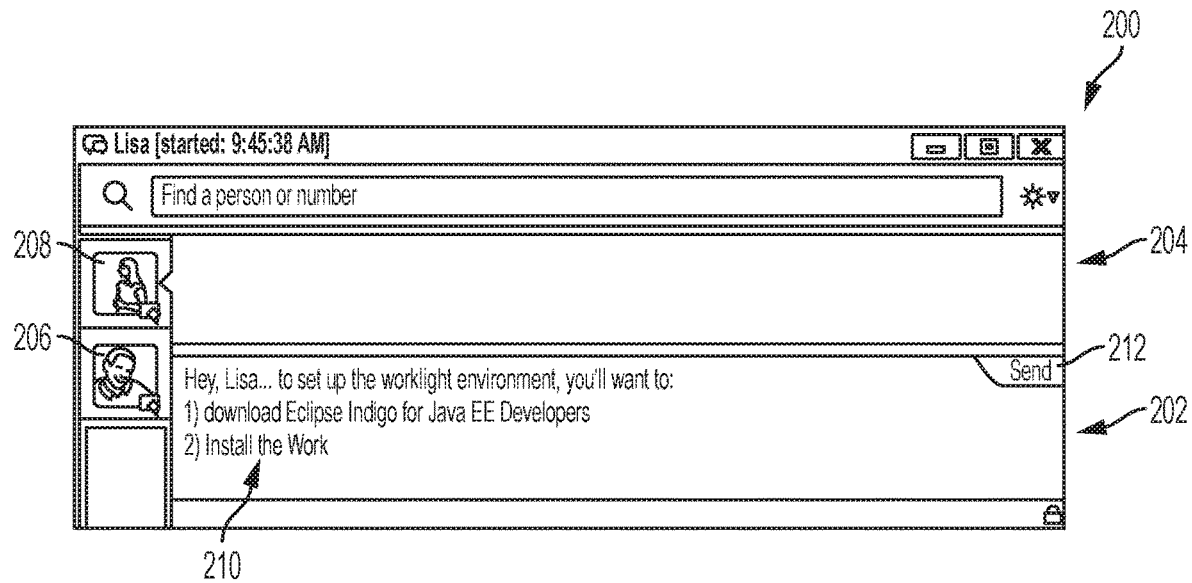
FIG. 2 shows a screenshot of a conversation between a user at a first communication device of the communication system and a party at second communication device of the communication system, in accordance with one embodiment of the invention.

FIG. 2 shows a screenshot 200 of a conversation between User A 206 at the first communication device 102 and User B 208 at the second communication device 104 in one embodiment of the invention. The conversation is generally displayed at the user interface 102b of the first communication device 102. The screenshot 200 shows a dialogue area 204 which displays a record of the conversation between User A 206 and User B 208 so far. Also shown is a first composition area 202 which shows a message ("first message") 210 that is in the process of being composed into a first input buffer at the first communication device 102 by User A 206. The first message 210 in first composition area 202 is part of the overall conversation that is displayed in the dialogue area 204. When User A 206 has finished composing the first message 210 in the first composition area 202, User A 206 may send the first message 210 by pressing a "Send" button 212 (which may be a user interface "Send" button) associated with the first composition area 202. Once the first message 210 has been sent, it will be displayed in the dialogue area 204.

Figure 3:
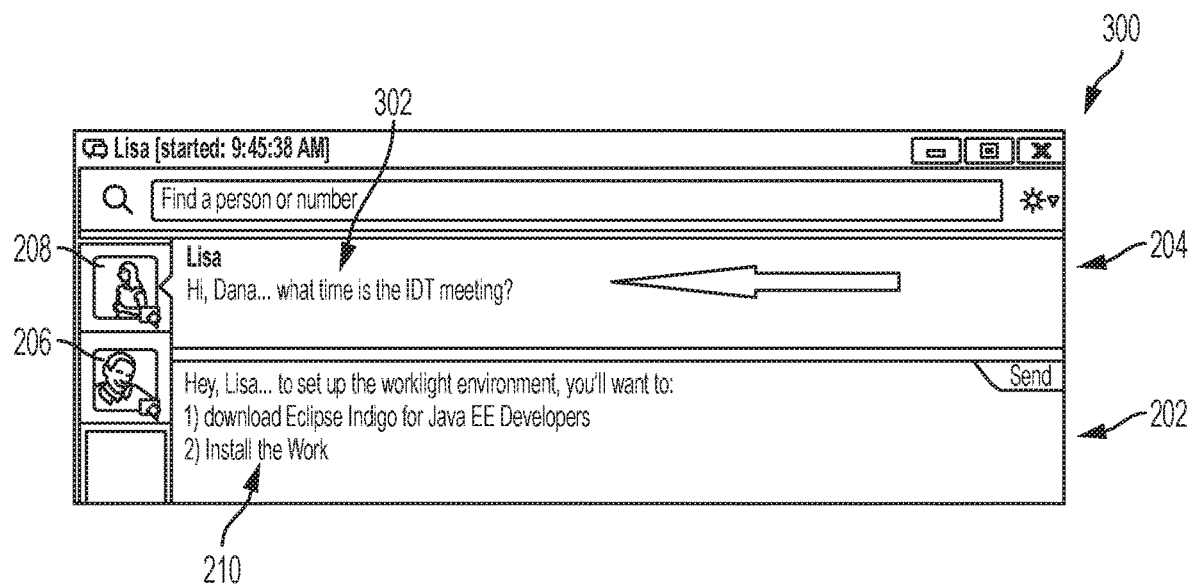
FIG. 3 shows a screenshot illustrating an interruption of the flow of the conversation between the user and the party in accordance with an embodiment of the present invention.

FIG. 3 shows a screenshot 300 illustrating an interruption of the flow of the conversation between the User A 206 and the User B 208. In this embodiment, a received message 302 indicates that User B 208 has started a second topic of conversation with User A 206. In particular, User B 208 has sent a question regarding a time of a meeting. This question has been received by User A 206 while User A 206 is in the middle of composing the first message on the first topic. In this case, the question from User B 208 requires only a short reply, while the first message 210 related to the first conversation topic requires more composition before it is ready to be sent. User A 206 can choose to pause the composition of her first message 210 on the first topic in order to quickly respond to User B 208 with a second message on the second topic.

Figure 4:
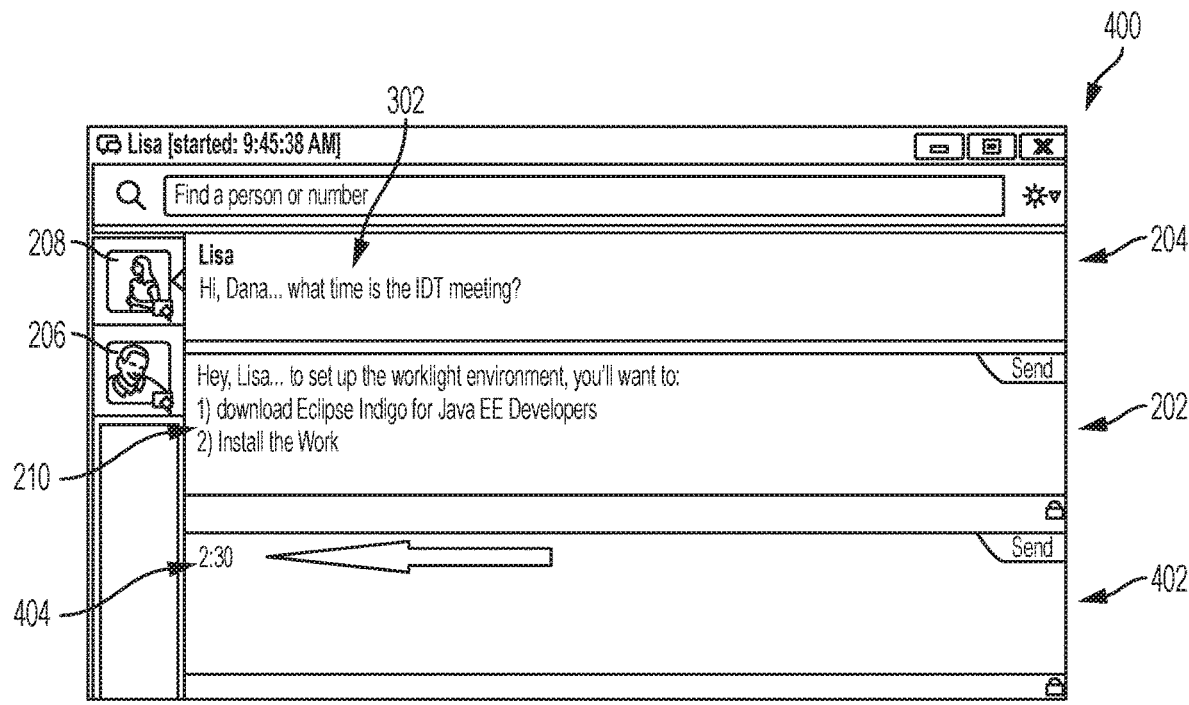
FIG. 4 shows a screenshot illustrating an operation at the first communication device allowing the user to respond to a second conversation topic in accordance with an embodiment of the present invention.

FIG. 4 shows a screenshot 400 illustrating an operation at the first communication device 102 allowing User A 206 to respond to a second conversation topic. The first communication device 102 opens a second composition area 402 upon receiving a triggering signal or triggering mechanism. The second composition area 402 provides a second input buffer for User A 206. Providing the second composition area 402 allows User A to pause composition of the first message 210 in order to compose and send a second message 404 on the second topic. In FIG. 4, User A has input the second message 404 (i.e., the response: "2:30"). User A 206 then provides a signal (i.e., presses the "Send" button) to request the first communication device 102 to send the second message 404 to the second communication device 104.

In one embodiment, the triggering signal is provided by User A 206 at the user interface 102b. In various embodiments, User A 206 can provide a vocal or audio signal, press a button, press a user interface button, perform a gesture at the user display, provide an input using a computer mouse, etc., in order to provide the triggering signal. In another embodiment, the first communication device 102 can run a natural language processing (NLP) program that analyzes the messages received from User B in order to determine whether a message received from User B 208 is part of the first conversation 202 or is a part of a different conversation. The natural language processing program can be run on the first communication device 102, the second communication device 104 or at a server located in the communication network 106. The natural language processing program can determine that a new topic has been started by latent semantic indexing and/or by other methods for extracting topics of sentences and paragraphs. Additionally, the natural language processing program can identify a new question mark symbol in order to determine a new conversation has been started. When the natural language processing program determines that the message received from User B 208 is not part of the first conversation 202, the natural language processing program may provide the triggering signal to the first communication device 102, causing the second composition area 402 to appear in the user interface 102b of the first communication device 102 without requiring a triggering signal from User A 206.

The first communication device 102 allows User A 206 to select which of the first composition area 202 and the second composition area 402 is the active composition area (i.e., the composition area in which a message is being actively composed) and which is the inactive composition area (i.e., the composition area in which the message is on hold). Thus, User A 206 can move back and forth between the first composition area 202 and the second composition area 402.

Figure 5:
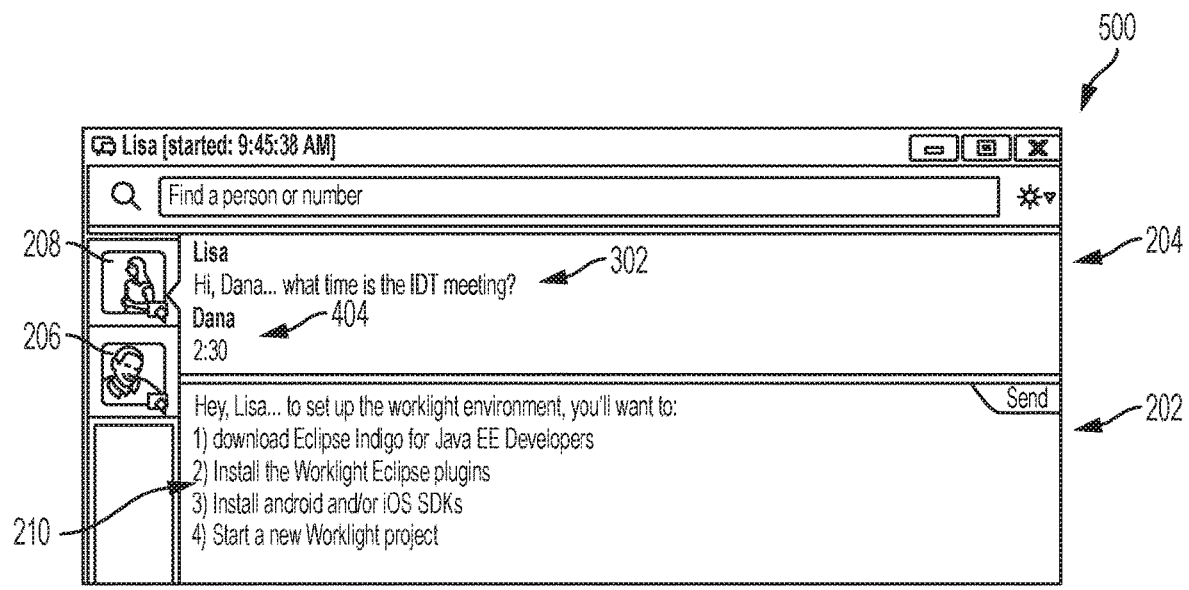
FIG. 5 shows a screenshot illustrating a user interface at the first communication device after a user has sent a second message responding to the second topic of conversation in accordance with an embodiment of the present invention.

FIG. 5 shows a screenshot 500 illustrating the user interface 102b after User A 206 has sent the second message 404 responding to the second topic of conversation. The second message 404 is shown in the dialogue area 204. The first communication device 102 has returned User A 206 to the first composition area 202, allowing User A 206 to continue and complete composition the first message 210.

Figure 6:
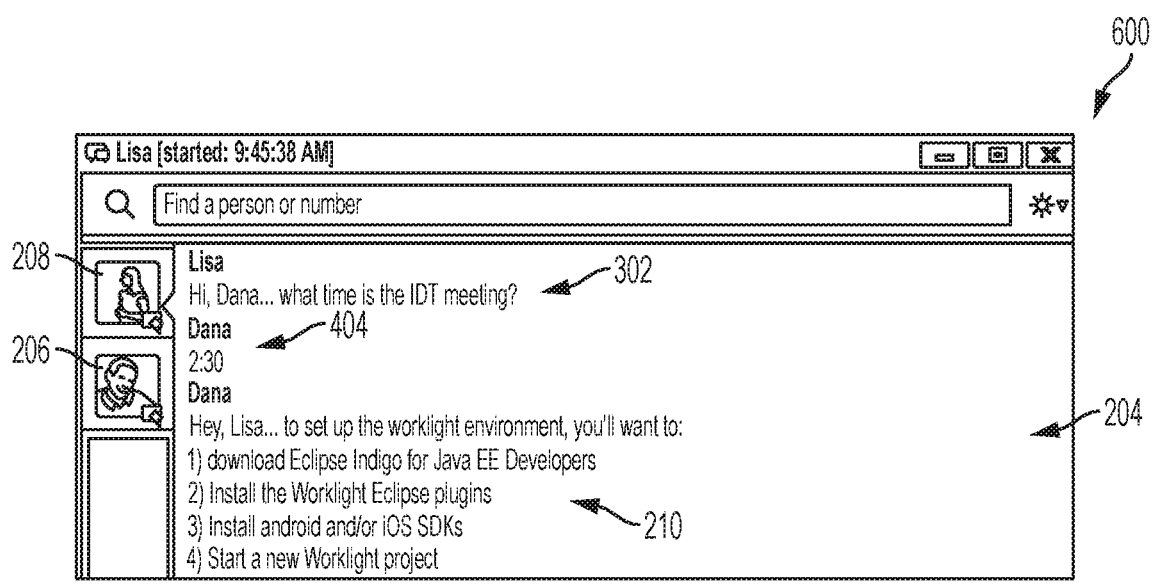
FIG. 6 shows a screenshot illustrating the dialogue area after a user has completed and sent a first message with regard to the first topic of conversation in accordance with an embodiment of the present invention.

FIG. 6 shows a screenshot 600 illustrating the dialogue area 204 after User A 206 has completed and sent the first message 210 with regard to the first topic of conversation. The completed first message 210 now appears in the dialogue area 204 along with the received message 302 from User B 208 regarding meeting time and the second message 404, which was previously sent in response to the received message 302.

Figure 7:
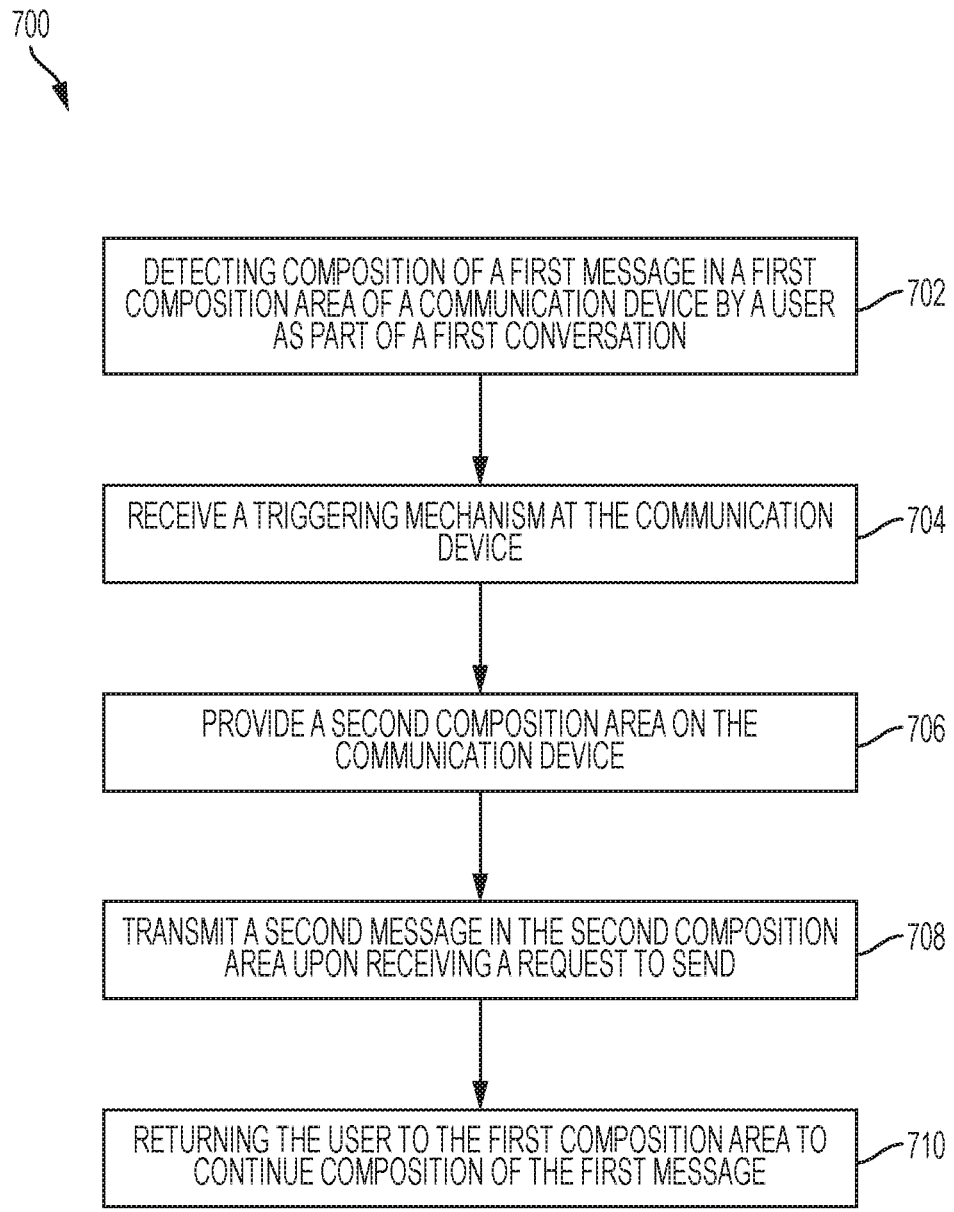
FIG. 7 shows a flowchart illustrating a method for operating a communication device to allow a user to carry on two conversations between the user and the other party, in one embodiment of the present invention.

FIG. 7 shows a flowchart 700 illustrating a method for operating a communication device to allow User A to carry on two conversations between User A and User B, in one embodiment of the present invention. In Box 702, the communication device detects composition of a first message in a first composition area of the communication device by User A as part of a first conversation. In Box 704, the communication device receives a triggering signal. The triggering signal can be provided either by User A, who decides to pause the first conversation topic in order start a second conversation topic, or by receiving a message from the other party (User B). In Box 706 in response to the triggering signal, the communication device provides a second composition area to User A. In Box 708, the communication device receives a request to send (from User A) and, in response, transmits a second message that is in the second composition area. In Box 710, the communication device returns User A to the first composition area to allow User A to continue composition of the first message.

Figure 8:
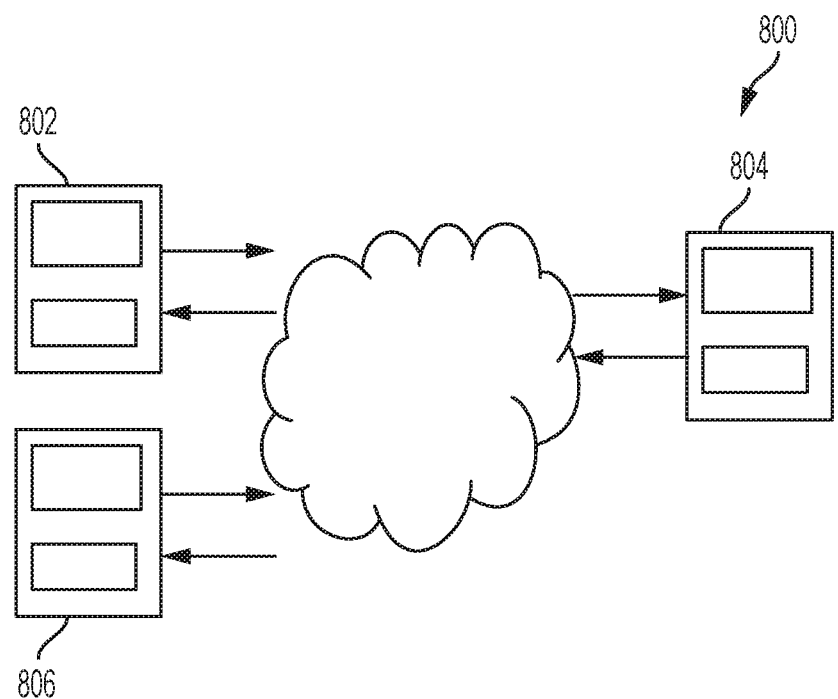
FIG. 8 shows a communication system providing another method by which the user can respond to the second topic of conversation in accordance with an embodiment of the present invention.

FIG. 8 shows a communication system 800 providing another method by which a user can respond to the second topic of conversation. The communication system 800 includes a first communication device 802 operated by User A and a second communication device 804 operated by the other party (User B). User A also has a third communication device 806 in her possession. As an illustration, User A can have a cellular smartphone as the first communication device 802 and a tablet as the third communication device 806. Due to the small amount of display space on a smartphone, User A may wish to employ the third communication device to send the second message. User A can therefore indicate (e.g., by selecting a button, performing a hand gesture, providing a voice command, etc., or some combination thereof) to send the triggering signal from the first communication device 802 to the third communication device 806, thereby opening the second composition area at the third communication device 806. User A can then compose and send the second message at the third communication device 806 without interrupting composition of the first message at the first communication device 802.

Figure 9:
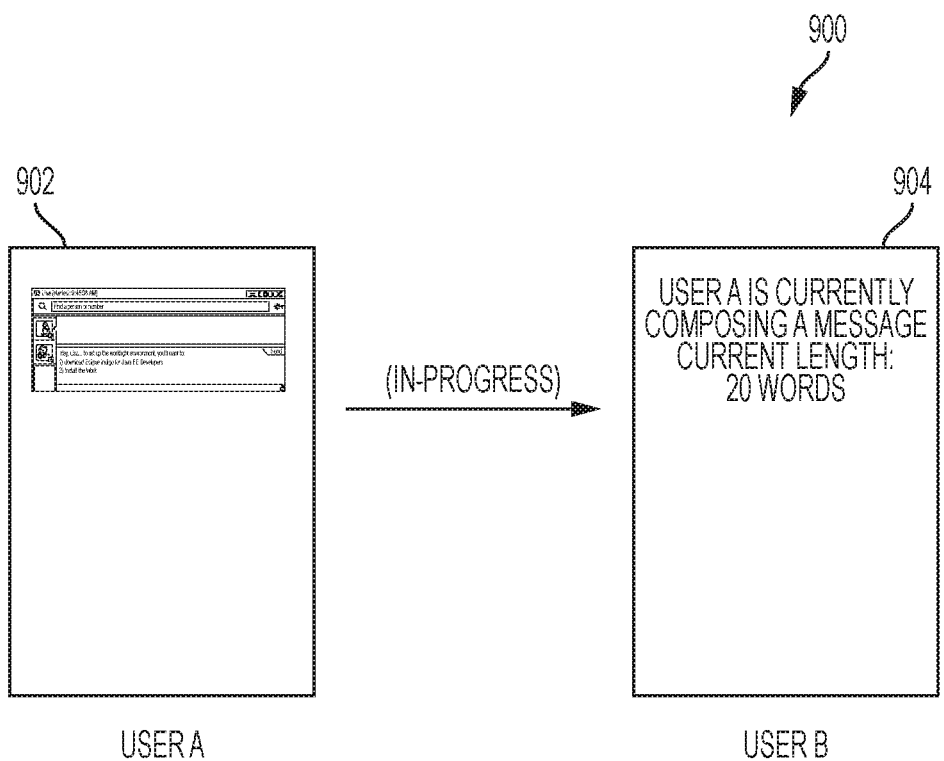
FIG. 9 shows a system for communicating the existence of a composition-in-progress from one communication device to another in accordance with an embodiment of the present invention.

FIG. 9 illustrates a system 900 for communicating the existence of a composition-in-progress from one communication device to another. The second communication device 904 provides User B an indication that User A is currently in the act of composing a message on the first communication device 902 and/or indicates a current number of words in the message being composed or a current extent or current length of the message being composed. For example, a window at the second communication device 904 can display a message, e.g., "Would you like to wait? User A is composing a message to you currently and it is 15 words long." When User B receives this indication, she can decide to wait before sending her question or message. In another embodiment, an icon that represents User A at the second communication device 904 can change colors when User A is in the process of typing her message.

Figure 10:
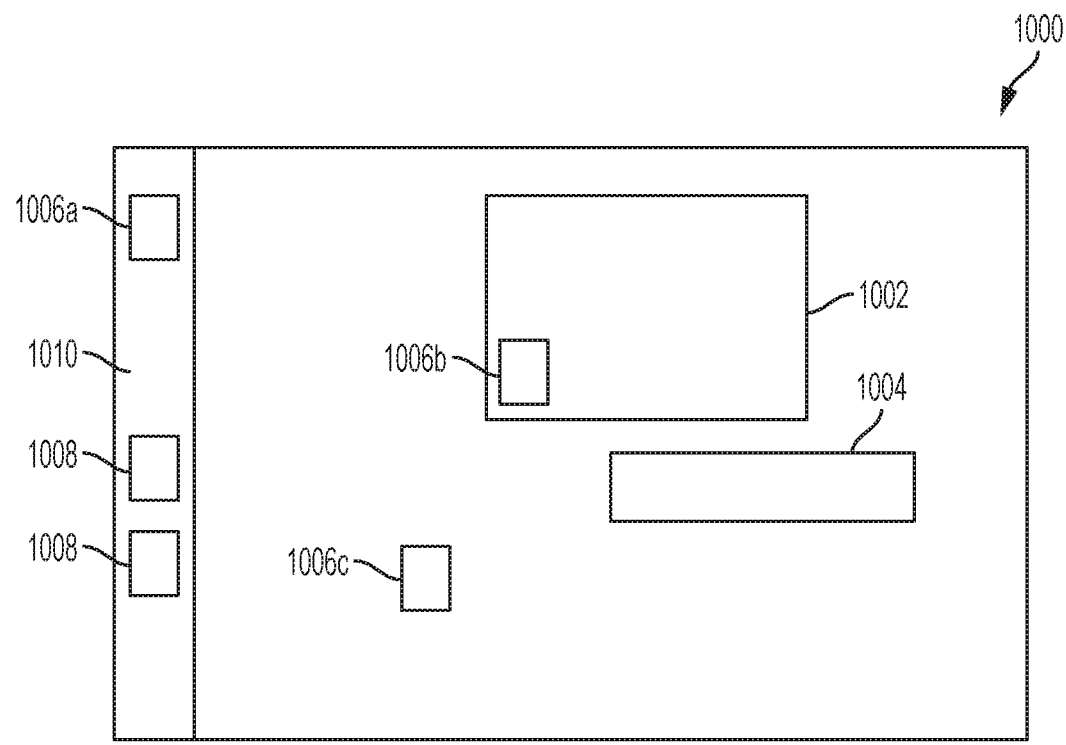
FIG. 10 shows a user interface illustrating various alternate methods of displaying a first composition area and a second composition area to the user in accordance with an embodiment of the present invention.

FIG. 10 shows a user interface 1000 illustrating various alternate methods of displaying a first composition area and a second composition area to a user. In one embodiment, the user interface 1000 can display both the first composition area 1002 and the second composition area 1004 simultaneously. Alternatively, the first user interface 1000 displays only the active composition area (which may be either the first composition area 1002 or the second composition area 1004). For illustrative purposes, the first composition area 1002 is shown as the active composition area. In order to select the active composition area, the communication device receives an input from the user (User A) to reduce the inactive composition area to an icon at a selected location of the user interface 1000. In one embodiment, an icon 1006a appears at a toolbar 1010. The toolbar 1010 can be to one side of the user interface 1000 or at a top side or a bottom side, etc. In an alternate embodiment, an icon 1006b can be at a location within the active composition area 1002. In yet another embodiment, an icon 1006c can be at any suitable location within the user interface 1000. The toolbar 1010 can also include icons 1008 which indicate the existence of pending compositions to parties-on-hold. The icons 1008 may include a visual representation of the conversations such as a face of the parties-on-hold or suitable icon, the name of the parties-on-hold and/or a first few letters of the conversations between the user and the parties-on-hold.

Figure 11:
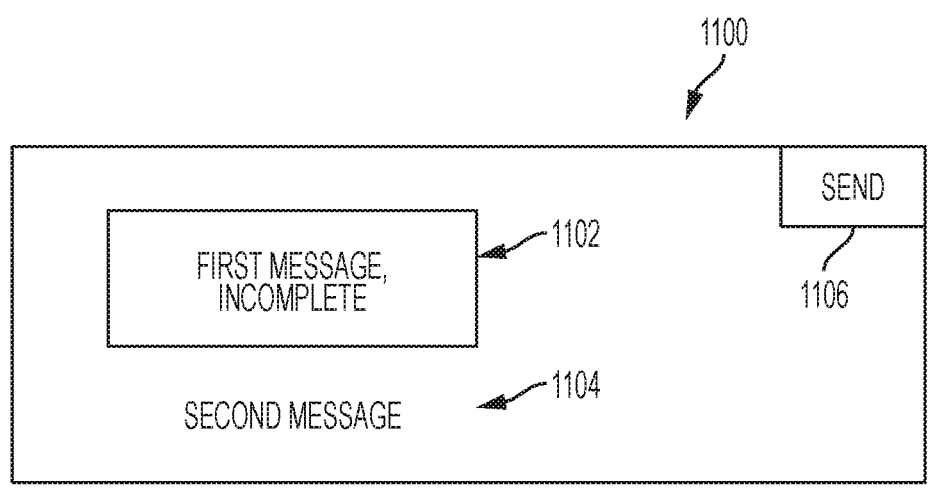
FIG. 11 shows another method of providing a second conversation between the user and the other party, in one embodiment of the present invention.

FIG. 11 shows another method of providing a second conversation between the user and the other party in another embodiment of the present invention. User A can "swipe" the current text of the first message into an on-hold buffer (e.g. with a gesture or mouse). For example, User A can highlight or color all of first message 1102 within the first composition area 1100 with a selected color, thereby placing the first message in a buffer. User A can then compose the second message 1104, send the second message 1104 (by pressing button 1106) and later retrieve the buffered text of the first message 1102.

Figure 12:
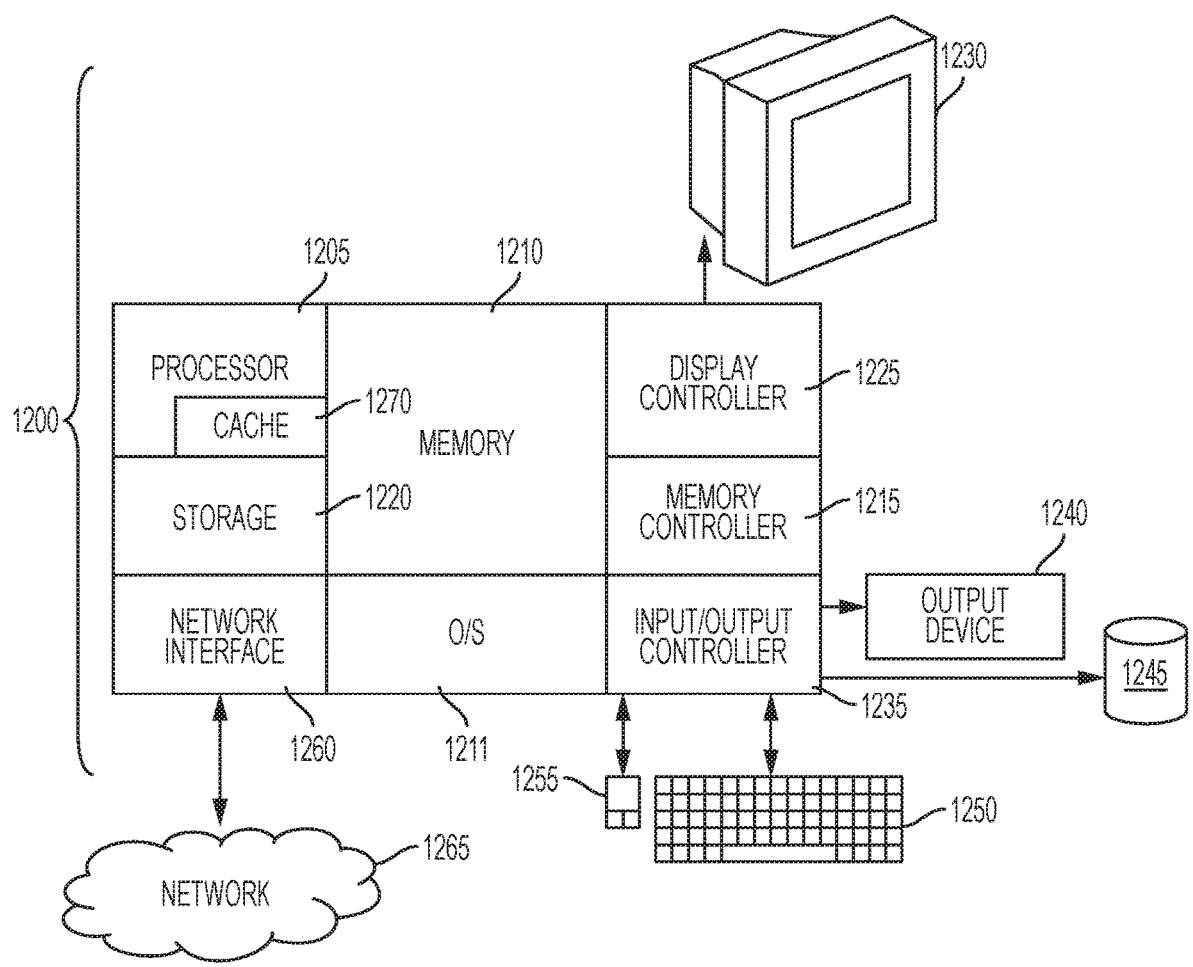
FIG. 12 shows a block diagram of a computer system for use in implementing a system or method according to some embodiments of this disclosure.

FIG. 12 illustrates a block diagram of a computer system 1200 for use in implementing a system or method according to some embodiments. The systems and methods described herein may be implemented in hardware, software (e.g., firmware), or a combination thereof. In some embodiments, the methods described may be implemented, at least in part, in hardware and may be part of the microprocessor of a special or general-purpose computer system 1200, such as a personal computer, workstation, minicomputer, or mainframe computer.

In some embodiments, as shown in FIG. 12, the computer system 1200 includes a processor 1205, memory 1210 coupled to a memory controller 1215, and one or more input devices 1245 and/or output devices 1240, such as peripherals, that are communicatively coupled via a local I/O controller 1235. These devices 1240 and 1245 may include, for example, a printer, a scanner, a microphone, and the like. Input devices such as a conventional keyboard 1250 and mouse 1255 may be coupled to the I/O controller 1235. The I/O controller 1235 may be, for example, one or more buses or other wired or wireless connections, as are known in the art. The I/O controller 1235 may have additional elements, which are omitted for simplicity, such as controllers, buffers (caches), drivers, repeaters, and receivers, to enable communications.

The I/O devices 1240, 1245 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 1205 is a hardware device for executing hardware instructions or software, particularly those stored in memory 1210. The processor 1205 may be a custom made or commercially available processor, a central processing unit (CPU), an auxiliary processor among several processors associated with the computer system 1200, a semiconductor based microprocessor (in the form of a microchip or chip set), a macroprocessor, or other device for executing instructions. The processor 1205 includes a cache 1270, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 1270 may be organized as a hierarchy of more cache levels (L1, L2, etc.).

The memory 1210 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 1210 may incorporate electronic, magnetic, optical, or other types of storage media. Note that the memory 1210 may have a distributed architecture, where various components are situated remote from one another but may be accessed by the processor 1205.

The instructions in memory 1210 may include one or more separate programs, each of which comprises an ordered listing of executable instructions for implementing logical functions. In the example of FIG. 12, the instructions in the memory 1210 include a suitable operating system (OS) 1211. The operating system 1211 essentially may control the execution of other computer programs and provides scheduling, input-output control, file and data management, memory management, and communication control and related services.

Additional data, including, for example, instructions for the processor 1205 or other retrievable information, may be stored in storage 1220, which may be a storage device such as a hard disk drive or solid state drive. The stored instructions in memory 1210 or in storage 1220 may include those enabling the processor to execute one or more aspects of the systems and methods of this disclosure.

The computer system 1200 may further include a display controller 1225 coupled to a display 1230. In some embodiments, the computer system 1200 may further include a network interface 1260 for coupling to a network 1265. The network 1265 may be an IP-based network for communication between the computer system 1200 and an external server, client and the like via a broadband connection. The network 1265 transmits and receives data between the computer system 1200 and external systems. In some embodiments, the network 1265 may be a managed IP network administered by a service provider. The network 1265 may be implemented in a wireless fashion, e.g., using wireless protocols and technologies, such as WiFi, WiMax, etc. The network 1265 may also be a packet-switched network such as a local area network, wide area network, metropolitan area network, the Internet, or other similar type of network environment. The network 1265 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods according to this disclosure may be embodied, in whole or in part, in computer program products or in computer systems 1200, such as that illustrated in FIG. 12.

Technical effects and benefits of some embodiments include providing multiple buffers between two parties within a single conversation. Embodiments enable interrupting one conversational topic with another conversational topic with minimum of command entries from the user into her communication device.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for providing a communication from a first communication device, the computer-implemented method comprising:
    providing a first composition area within a user interface of the first communication device for typed composition of a first message by a user, wherein the first message is part of a first conversation topic between the user and a party on a second communication device, the first conversation topic being displayed in a dialogue area within the user interface of the first communication device;
    receiving an incoming message at the first communication device from the second communication device during composition of the first message;
    displaying the incoming message in the dialogue area;

determining, using natural language programming at the first communication device, that the incoming message indicates a second conversation topic different from the first conversation topic to generate a triggering signal;

opening, at the first communication device, a second composition area within the user interface of the first communication device in response to the triggering signal, while retaining the first message in the first composition area, the second composition area displayed in the user interface simultaneously together with the first composition area;

receiving, at the second composition area of the first communication device, an input of a typed second message from the user corresponding to the second conversation topic for display in the dialogue area while the composition of the first message is paused;

transmitting the second message from the first communication device to the second communication device in response to receiving a signal to send the second message;

displaying the second message from the user at the dialogue area upon transmitting the second message from the first communication device to the second communication device;

displaying an indication at the second communication device of a current length of the first message being composed at the first communication device; and returning the user to the first composition area to complete the paused composition of the first message upon transmitting the second message.

2. The method of claim 1, wherein the triggering signal is caused by receipt of the incoming message at the first communication device from the party on the second communication device.

3. The method of claim 2, wherein the first communication device receives the incoming message from the second communication device and the natural language processing program provides the triggering signal upon processing the first message of the first conversation stream and the message received from the second communication device to determine that the message received from the second communication device is not part of the first conversation topic.

4. The method of claim 1, wherein the first message and the second message are received over a communication buffer that is shared between the party and the user of the communication device.

5. The method of claim 1, further comprising sending the triggering signal from the first communication device to a third communication device to open the second composition area on the third communication device.

6. A system for providing a communication from a first communication device, the system comprising:

a memory having computer readable instructions; and one or more processors for executing the computer readable instructions, the computer readable instructions comprising:

providing a first composition area within a user interface of the first communication device for composition of a first message by a user, wherein the first message is part of a first conversation topic between the user and a party on a second communication device, the first conversation topic being displayed in a dialogue area within the user interface of the first communication device;

receiving an incoming message at the first communication device from the party at the second communication device during composition of the first message;

displaying the incoming message in the dialogue area;

determining, using natural language programming at the first communication device, that the incoming message indicates a second conversation topic different from the first conversation topic to generate a triggering signal;

opening, at the first communication device, a second composition area within the user interface of the first communication device in response to the triggering signal while retaining the first message in the first composition area, the second composition area displayed in the user interface simultaneously together with the first composition area;

receiving, at the second composition area of the first communication device, an input of a typed second message corresponding from the user to the second conversation topic for display in the dialogue area while the composition of the first message is paused;

transmitting the second message from the first communication device to the second communication device in response to receiving a signal to send the second message;

displaying the second message from the user at the dialogue area upon transmitting the second message from the first communication device to the second communication device;

displaying an indication at the second communication device of a current length of the first message being composed at the first communication device; and returning the user to the first composition area to complete the paused composition of the first message upon transmitting the second message.

7. The system of claim 6, wherein the triggering signal is caused by receipt of a message at the first communication device from the party on the second communication device.

8. The system of claim 7, wherein the triggering signal is receipt of the message from the party and the first communication device displays a second conversation area based on the natural language processing of the first message the first conversation stream and the second message received from the party.

9. The system of claim 6, wherein the first message and the second message are received over a communication buffer that is shared between the party and the user of the communication device.

10. The system of claim 6, further comprising sending the triggering signal from the first communication device to a third communication device and opening the second composition area on the third communication device.

11. A computer program product for providing a communication from a first communication device, the computer program product comprising a computer readable storage medium having program instructions embodied therewith, the program instructions executable by a processor to cause the processor to perform:

providing a first composition area within a user interface of the first communication device for composition of a first message by a user, wherein the first message is part of a first conversation topic between the user and a party on a second communication device, the first conversation topic being displayed in a dialogue area within the user interface of the first communication device;

receiving an incoming message at the first communication device from the second communication device during composition of the first message;

displaying the incoming message in the dialogue area;

determining, using natural language programming at the first communication device, that the incoming message indicates a second conversation topic different from the first conversation topic to generate a triggering signal;

opening, at the first communication device, a second composition area within the user interface of the first communication device in response to the triggering signal while retaining the typed first message in the first composition area, the second composition area displayed in the user interface simultaneously together with the first composition area;

receiving, at the second composition area of the first communication device, an input of a typed second message from the user corresponding to the second conversation topic for display in the dialogue area while composition of the first message is paused;

transmitting the second message from the first communication device to the second communication device in response to receiving a signal to send the second message;

displaying the second message from the user at the dialogue area upon transmitting the second message from the first communication device to the second communication device;

displaying an indication at the second communication device of a current length of the first message being composed at the first communication device; and returning the user to the first composition area to complete the paused composition of the first message upon transmitting the second message.

12. The computer program product of claim 11, wherein the triggering signal caused by receipt of a message at the first communication device from the party on the second communication device.

13. The computer program product of claim 12, wherein the triggering signal is receipt of the message from the party and the first communication device displays the second conversation area based on the natural language processing of the first message the first conversation stream and the second message received from the party.

14. The computer program product of claim 11, further comprising sending the triggering signal from the first communication device to a third communication device and opening the second composition area on the third communication device.

15. The method of claim 1, wherein the first message is delivered into an on-hold buffer in response to manual input from the user.

16. The method of claim 15, wherein the first message stored in the on-hold buffer is displayed simultaneously while the second message is typed.

17. The system of claim 6, wherein the first message is delivered into an on-hold buffer in response to manual input from the user.

18. The system of claim 17, wherein the first message stored in the on-hold buffer is displayed simultaneously while the second message is typed.

19. The computer program product of claim 11, wherein the first message is delivered into an on-hold buffer in response to manual input from the user.

20. The computer program product of claim 19, wherein the first message stored in the on-hold buffer is displayed simultaneously while the second message is typed.

* * * * *